US010061866B2

(12) United States Patent
Vaidya et al.

(10) Patent No.: US 10,061,866 B2
(45) Date of Patent: Aug. 28, 2018

(54) PROVIDING QUERY RECOURSE WITH EMBEDDED QUERY ADJUSTMENT OPTIONS

(71) Applicant: Microsoft Technology Licensing, LLC, Redmond, WA (US)

(72) Inventors: Yogesh Ajit Vaidya, Bellevue, WA (US); Hua Ding, Redmond, WA (US); Nan Wu, Kirkland, WA (US); Aaron Chun Win Yuen, Bellevue, WA (US); Karim Hasham, Bellevue, WA (US); Parthasarathy Govindarajen, Bothell, WA (US); Arun Sacheti, Sammamish, WA (US); Yanfeng Sun, Redmond, WA (US); Yandong Guo, Bellevue, WA (US); Deepak Santhanam, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 361 days.

(21) Appl. No.: 14/749,914

(22) Filed: Jun. 25, 2015

(65) Prior Publication Data
US 2016/0378777 A1 Dec. 29, 2016

(51) Int. Cl.
*G06F 17/30* (2006.01)
(52) U.S. Cl.
CPC .............. *G06F 17/3097* (2013.01)
(58) Field of Classification Search
CPC ...................................................... G06F 17/30
See application file for complete search history.

(56) References Cited

U.S. PATENT DOCUMENTS

| 7,647,338 B2 | 1/2010 | Lazier et al. |
| 7,895,178 B2 | 2/2011 | Skillen et al. |
| 8,204,897 B1 * | 6/2012 | Djabarov .......... G06F 17/30705 707/767 |

(Continued)

OTHER PUBLICATIONS

"How to Disable Infinite Scrolling on Tumblr", Published on: Aug. 2, 2013, pp. 3 Available at: http://pcmadeeasy.tumblr.com/post/19329309214/how-to-disable-infinite-scrolling-on-tumblr.

(Continued)

*Primary Examiner* — Khanh B Pham
(74) *Attorney, Agent, or Firm* — The Watson I.P. Group, PLC; Vladan M. Vasiljevic

(57) ABSTRACT

A user query may be evaluated to provide a result set. In case the results do not reflect the user's intent, the device may provide recourse options for adjusting the query in a manner that yields more desirable results, e.g., a suggestion at the top of the result set for a different spelling, or recommendations at the end of the results set for additional query techniques that may yield more accurate results. However, such presentation of recourse options may clutter the user interface and/or go unnoticed by the user. Instead, an adjusted query may be identified with an interpreted probability of reflecting the intent of the query. An adjustment option describing the adjusted query may be inserted into the result set, between a higher-probability first result and a lower-probability second result. Selection of the adjustment option may cause the adjusted query to be evaluated on behalf of the user.

20 Claims, 9 Drawing Sheets

(56) References Cited

U.S. PATENT DOCUMENTS

| | | | |
|---|---|---|---|
| 8,521,725 B1* | 8/2013 | Pearson | G06F 17/30675 707/722 |
| 8,676,803 B1 | 3/2014 | Leung et al. | |
| 2009/0327236 A1 | 12/2009 | Denney et al. | |
| 2010/0228710 A1* | 9/2010 | Imig | G06F 17/30867 707/706 |
| 2013/0282683 A1* | 10/2013 | Kohavi | G06F 17/30864 707/706 |
| 2014/0379689 A1* | 12/2014 | Huffman | G06F 17/3087 707/711 |

OTHER PUBLICATIONS

Panos, "Disabling Infinite Scrolling", Published on: Jun. 5, 2012, pp. 18 Available at: http://wpbtips.wordpress.com/2012/06/05/disabling-infinite-scrolling/.

Smith, Alan, "Reach a Definite Logical End Using Infinite Scrolling", Published on: Jun. 13, 2013, pp. 9 Available at: http://www.searchenginejournal.com/reach-a-definite-logical-end-using-infinite-scrolling/64008/.

McGee, Matt, "Bing's May Search Updates: Domain Cleanup, Recourse Links, Related Searches", Published on: Jun. 13, 2012, pp. 3 Available at: http://searchengineland.com/bings-may-search-updates-domain-cleanup-recourse-links-related-searches-124592.

* cited by examiner

PROVIDING QUERY RECOURSE WITH EMBEDDED QUERY ADJUSTMENT OPTIONS

BACKGROUND

Within the field of computing, many scenarios involve a fulfillment of a query submitted by a user, such as a web search engine fulfilling a query over a set of websites; a media search engine fulfilling a query over a media library; and a database query processing engine fulfilling a query over a relational data set. A user typically specifies the query as a set of keywords or criteria, which are compared with the items of the targeted data set, often facilitated by resources such as hash-based indices and binary search trees, to identify items that match the query. Such items are further evaluated to estimate a result probability that the item fulfills the query; sorted in order of descending probability; and presented to the user as the results of the query.

In many such scenarios, a variety of circumstances may cause the query submitted by the user not to reflect the intent of the user. For example, the user may have misspelled a token, such as the name of an individual, or may not have used terms that describe the requested items with optimal accuracy. Some searches may be difficult to specify; e.g., a search for information about the musical group "The Who" is often difficult for search engines to evaluate, due to the commonality of the keywords "the" and "who" in many bodies of English text. Ambiguity may also arise, e.g., where the user specifies an ambiguous keyword that may describe one of several topics; e.g., a search for the keyword "matrix" may refer to the mathematics concept, a structural arrangement arising in the fields of chemistry and materials science, or a popular film.

Due to these sources of ambiguity, devices that fulfill user-expressed queries may provide additional resources that may assist the user if the presented search results do not reflect the intent of the user. As a first such example, if a keyword is likely to represent a misspelling, the device may present a suggestion of an alternative spelling that may provide more accurate results. As a second such example, the device may present suggestions for helpful options if the user exhausts the result set without finding a desired result (e.g., "try broadening your search or using different terms"). These and other techniques may provide recourse for queries that fail to yield results that fulfill the intent of the user's query.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While many devices and services provide recourse options to assist users in case the results of a query do not reflect the user's intent, the manner in which such options are presented may be disadvantageous. As a first such example, if a suggestion is presented before a list of search results, the user may overlook the option in order to view the search results. Alternatively, the user may decide to adopt the suggestion after reviewing some search results, but may then have to navigate or scroll back to the top of the list to find and activate the option. As a second such example, a suggestion for refining a query may be presented at the end of the result set or the bottom of a web page, but the user may choose to abandon or refine the search before reaching the end of the result set, and may therefore fail to see the suggestion. Additionally, the presentation of options and controls peripherally to the search results may present visual clutter on larger displays, and may further constrain the presentation of information via a mobile device or audio-only interface.

Presented herein are techniques for providing recourse options for a user in case a query does not provide results that fulfill the intent of the user. In accordance with such techniques, in connection with a literal query of the user, an adjusted query may be identified, along with an interpreted probability that the results of the adjusted query reflect the intent of the user. Within the result set sorted in descending order by result probability, an adjustment option may be inserted at an adjustment position between a first result having a higher result probability than the interpreted probability and a second result having a lower result probability. The adjustment option may be presented with the result set at the adjustment position, describing the adjusted query that may reflect the intent of the user in formulating the literal query; and responsive to a user selection of the adjustment option, the device may evaluate the adjusted query. In this manner, the device may present recourse options for refining the query to reflect the intent of the user with higher accuracy in a more timely manner (e.g., consistent with a user's natural pattern in reviewing the search results), thereby providing a more user-friendly and intuitive search interface for the user.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
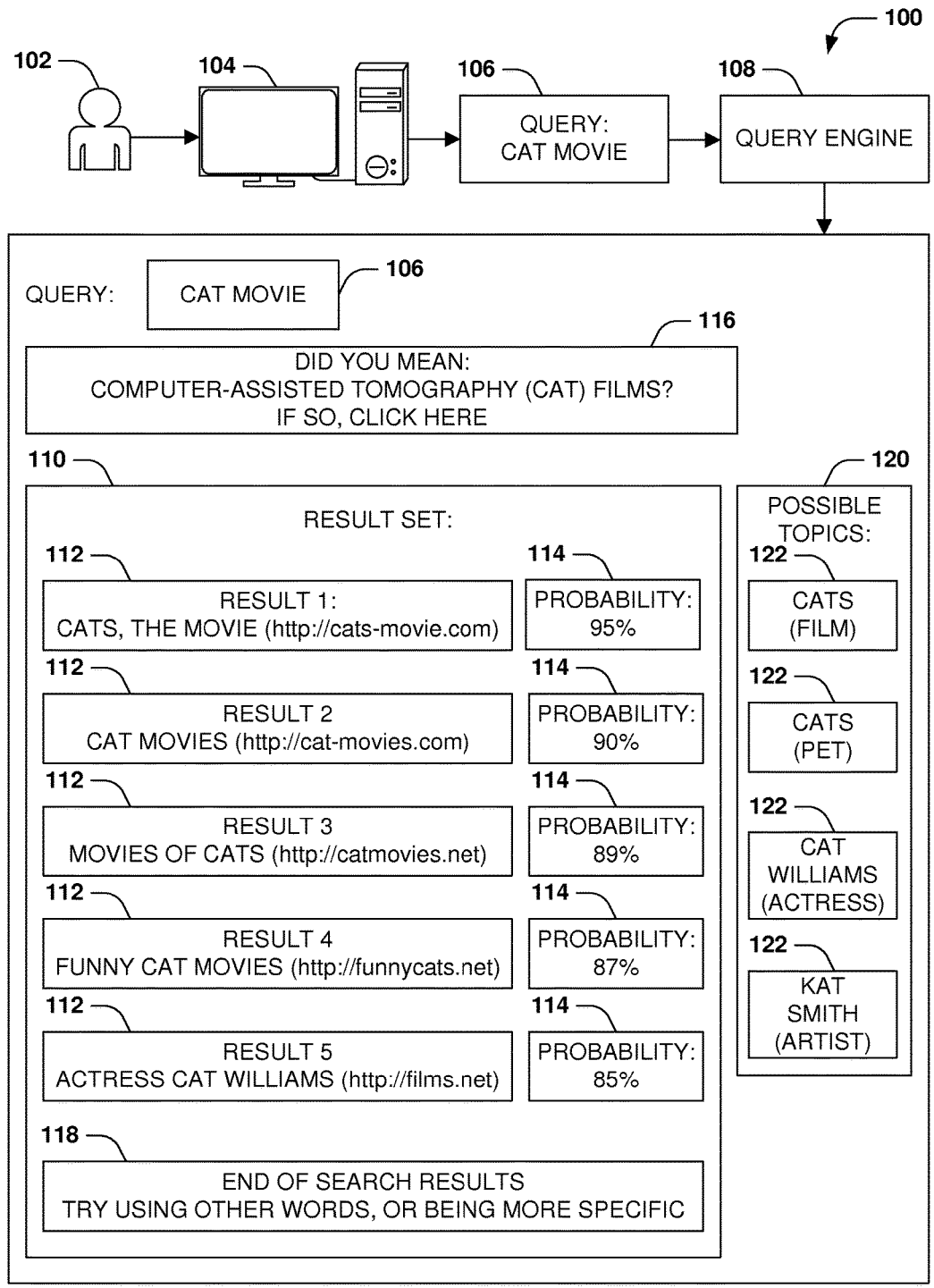
FIG. 1 is an illustration of an example scenario featuring a fulfillment of a literal query of a user through a presentation of a result set.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 featuring various techniques for fulfilling a literal query 106 submitted by a user 102 of a device 104. In this example scenario 100, the user 102 expresses a keyword-based literal query 106, comprising the phrase "cat movie"; however, such queries may include a range of query types (e.g., Boolean, criteria-based, and Structured Query Language (SQL) queries) and/or modalities (e.g., text entry, speech, and/or contextual inference). The literal query 106 is submitted to a query engine 108, which compares the keywords of the literal query 106 to a set of items, such as web pages, media, documents, messages, files, and/or database records. The query engine 108 identifies a result set 110 of results 112 that satisfy the criteria of the literal query 106, and presents the results 112 to the user 102 in response to the literal query 106. The user 102 may select any of the results 112 to view the corresponding item; e.g., selecting a result 112 describing a web page may cause a web browser of the device 104 to retrieve and render the web page, while selecting a result 112 describing a media object, such as an image or video, may cause the device 104 to retrieve and present the media object to the user 102.

As further illustrated in the example scenario 100 of FIG. 1, the literal query 106 submitted by the use 102 may lead to a variety of inferences of various probabilities as to the intent of the user 102. For example, the literal query 106 "cat movie" may be inferred as expressing a variety of requests, such as a request for home movies depicting cats; a request for feature-length films featuring live-action or animated cats; a request for documentary movies that provide informative discussion of cats; a request for information about a movie version of the play having the name Cats; or a request for information about an actress with a first name of Cat. The query engine 108 may account for such possibilities in the intent of the user 102 by presenting results 112 in the result set 100 that pertain to each such possibility, and the description presented with each result 112 may enable the user 102 to distinguish a suitable result 112 from undesired results 112. Moreover, the query engine 108 may compute a result probability 114 that each result 112 reflects the intent of the user 102 (e.g., by considering which results 112 were selected by other users 102 who submitted the same literal query 106 and were presented with the same result set 110). The query engine 108 may therefore sort the result set 110 in descending order of result probability 114, thereby presenting the results 112 with the highest result probability 114 first and at the top of a results list, and presenting other results 112 with lower result probabilities 114 further down the results list.

As further illustrated in the example scenario 100 of FIG. 1, even such techniques may not adequately fulfill the query of the user 102. For example, for the literal query 106 "cat movies," less probable but still possible options for the intent of the user 102 include movies about computer-assisted tomography, which is occasionally referenced by the acronym "CAT," and information about an actress having a first name of Kat, who the literal query 106 may reference with incorrect spelling. It may not be adequate for the query engine to commingle results 112 for such topics with the results 112 that more probably match the literal query 106, since these results 112 may appear far down in the sort order, and the user 102 may stop reviewing the result set 110 before reaching such results 112. Accordingly, the query engine 108 may utilize other techniques to bring these alternative topics to the attention of the user 102.

As a first such example, the query engine 108 may present, before the result set 110, a first suggestion 116 that the user 102 may have intended the literal query 106 to reference the topic of computer-assisted tomography films. A selection of this first suggestion 116 by the user 102 may prompt the query engine 108 to present, instead of results 112 responsive to the literal query 106 "cat movie," a different result set 110 that is responsive to the "computer-assisted tomography films" query.

As a second such example, at the end of the result set 110, the query engine 108 may include a second suggestion 118 that may be appropriate when the user 102 has reviewed the entire result set 110 and has failed to find a result 112 that satisfies the intent of the literal query 106. For example, the second suggestion 118 may suggest submitting a second query that includes using different words than the first literal query 106, and/or including more specific terms that may enable the provision of a more selective result set 110.

As a third such example, the query engine 108 may present, in a peripheral region that is adjacent to the result set 110, a topic set 120 of topics 122 that may reflect the intent of the literal query 106. For example, as topics 122 that may match the intent of the term "cat" in the literal query 106, the topic set 120 may include such topics 122 as the film called Cats; the topic of cats as pets; an actress named Cat Williams; and an artist named Kat Smith. A selection of any topic 122 of the topic set 120 may prompt the query engine 108 to present a second result set 110 comprising only results 112 that relate to the specific topic 122 selected by the user 102. These and other suggestions may be presented peripherally to the result set 110 in order to provide options whereby the user 102 may clarify, disambiguate, focus, or otherwise adapt the literal query 106 to a more accurate representation of the intent of the user 102, which may enable a faster and/or more accurate fulfillment of the intent of the user 102 in interacting with the query engine 108.

B. Presented Techniques

Figure 2:
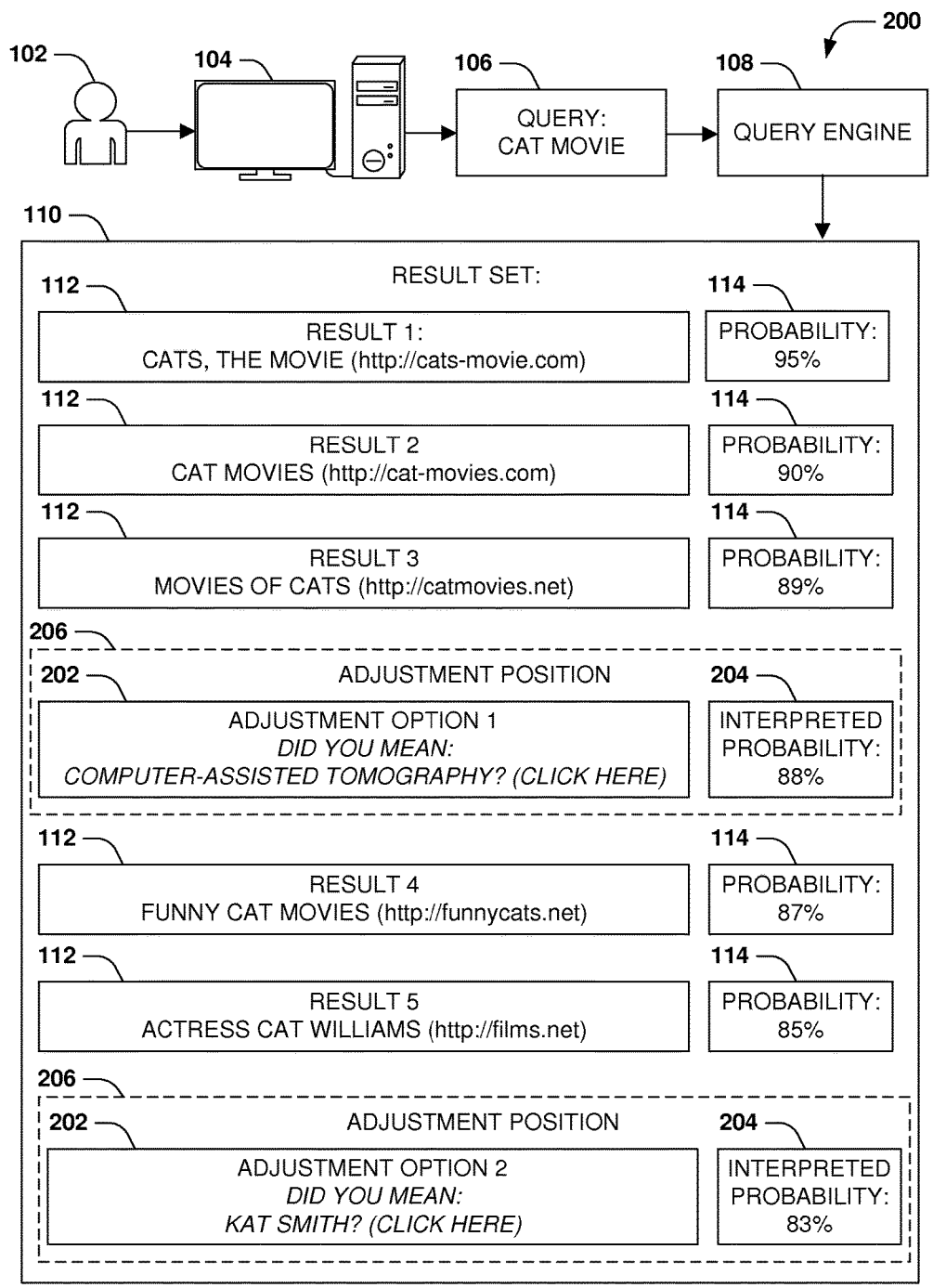
FIG. 2 is an illustration of an example scenario featuring a fulfillment of a literal query of a user through a presentation of a result set, in accordance with the techniques presented herein.

FIG. 2 presents an illustration of an example scenario 200 featuring a presentation of a result set 110 in accordance with the techniques presented herein.

In this example scenario 200, a user 102 of a device 104 submits a literal query 106, such as the keywords "cat movie," which is received and processed by a query engine 108 to identify a set of results 112. The respective results 112 may be identified with a probability 114 that the result 112 reflects the intent of the user 102 in formulating the literal query 106, and the result set 110 may be sorted and presented in descending order. However, a literal query 106 such as "cat movie" may present a considerable number of interpretations, and the user 102 may only locate results 114 that accurately reflect the intent of the user 102 considerably far down in the result set 110, or may not even appear at all in the result set 110. Accordingly, an adjusted query may be identified that presents an adjustment of the literal query 106, and that, if submitted as a substitute query, may accurately reflect the intent of the user 102 in formulating the literal query 106. Moreover, the adjusted query may be identified with an interpreted probability 204, i.e., a probability that the interpreted query reflects the intent of the user 102. Accordingly, an adjustment position 206 in the sorted result set 110 may be identified, between a first result having a higher result probability 204 and a second result having a lower result probability 204. At the adjustment position 206, an adjustment option 202 may be inserted for suggestion to the user 102 of an adjustment of the literal query 106 to reflect the interpreted query. The adjustment position 206 may be identified by comparing the interpreted probability 204 of the query adjustment with the result probabilities 114 of the results 112 of the literal query 106. The adjustment option 202 may describe the adjustment of the query (e.g., a correct spelling of a name that may have been misspelled in the literal query 106, or a refinement that resolves an ambiguous term in the literal query 106 to a specific term that may yield search results selective to the term). The result set 110 including the adjustment option 202 may be presented to the user 102. Responsive to a selection of the adjustment option 202 by the user 104, the adjusted query may be evaluated and an updated result set 110 presented to the user 102 in accordance with the techniques presented herein.

C. Technical Effects

The use of the techniques presented herein to evaluate a literal query 106 of the user 102 may, in some embodiments, result in a variety of technical effects.

As a first example of a technical effect that may be achievable by the techniques presented herein, the presentation of an adjustment option 202 to adjust a literal query 106 in a manner that may more accurately reflect the intent of the user 102 may enable the user 102 to arrive at a desired result 112 more quickly than other techniques. For example, a user 102 who wishes to find results 112 for an individual with a common name (e.g., "John Smith") may have to submit a significant number of literal queries 106, review a significant number of result sets 110, and devise query adjustments that may yield the desired results 112, without assistance from the query engine 108 as to how to arrive at a more desirable result set 110. Providing an adjustment option 202 that suggests a query adjustment may enable the user 102 to complete this process and arrive at a desired result set 110 faster, thereby providing a more efficient and responsive user experience for the user 102 of the query engine 108. The increased efficiency of the refinement process may also facilitate the query engine 108, e.g., by reducing the number of literal queries 106 submitted and evaluated by the user 102 that do not reflect the intent of the user 102, thereby economizing computational resources of the query engine 108 and/or improving the scalability of the query engine 108 to satisfy concurrent requests on behalf of a larger number of users 102.

As a second example of a technical effect that may be achievable through the techniques presented herein, the identification of an adjustment position 206 within the result set 110, where the adjustment option 202 is to be presented, may provide more convenient timing for the presentation of the adjustment option 202 to the user 102. For example, a literal query 106 that exhibits only minor ambiguity may result in a comparatively small interpreted probability of the adjustment option 202, and may therefore present a significant number of highly probable results 112 before presenting the adjustment option 202. Conversely, a literal query 106 that exhibits significant ambiguity may result in a comparatively high interpreted probability of the adjustment option 202, and may therefore present the adjustment option 202 early on in the result set 110 to reduce frustration of the user 102 with receiving a set of undesirable results 112. In this manner, the selection of the adjustment position 206 may accurately reflect the relative probabilities, in each scenario, that the results 112 and the adjustment option 202 match the intent of the user 102 in formulating the literal query 106, and may therefore provide a more efficient user experience for the user 102.

As a third example of a technical effect that may be achievable through the techniques presented herein, the placement of the adjustment option 202 within the result set 110 (e.g., between two results 112 of the literal query 106) may conserve display space of the device 104, as compared with placement of the adjustment option 202 outside of the result set 110. For example, many devices feature a limited display space, and careful design choices may be involved in positioning the visual elements of the user interface on the display in a manner that is usable and uncluttered. The techniques presented in the example scenario 100 of FIG. 1 may undesirably consume such display space, e.g., squeezing the result set 110 into a smaller visual area in order to make room for the presentation of an adjacent adjustment option. By contrast, inserting the adjustment option 206 into the result set 110 may expand the allocation of the display space for the result set 110, e.g., presenting a single, scrollable list of results 112 that happens to include the adjustment option 202.

As a fourth example of a technical effect that may be achievable through the techniques presented herein, the insertion of the adjustment option 220 into the result set 110 may provide a more consistent appearance than presenting the adjustment option 202 outside of the result set 110, e.g., adjacent to the result set 110. For example, the adjustment option 202 inserted between the results 112 may utilize the same visual appearance as the results 112, such as the same font, font size, color, and button type, and may also scroll together with the results 112. By contrast, presenting the adjustment option 202 outside of the result set 110 may lead to a visually dissonant presentation, where the adjustment option 202 looks different and/or remains stationary while the user 102 scrolls through the results set 110. These and other technical effects may be achievable through various implementations of the techniques presented herein.

D. Example Embodiments

Figure 3:
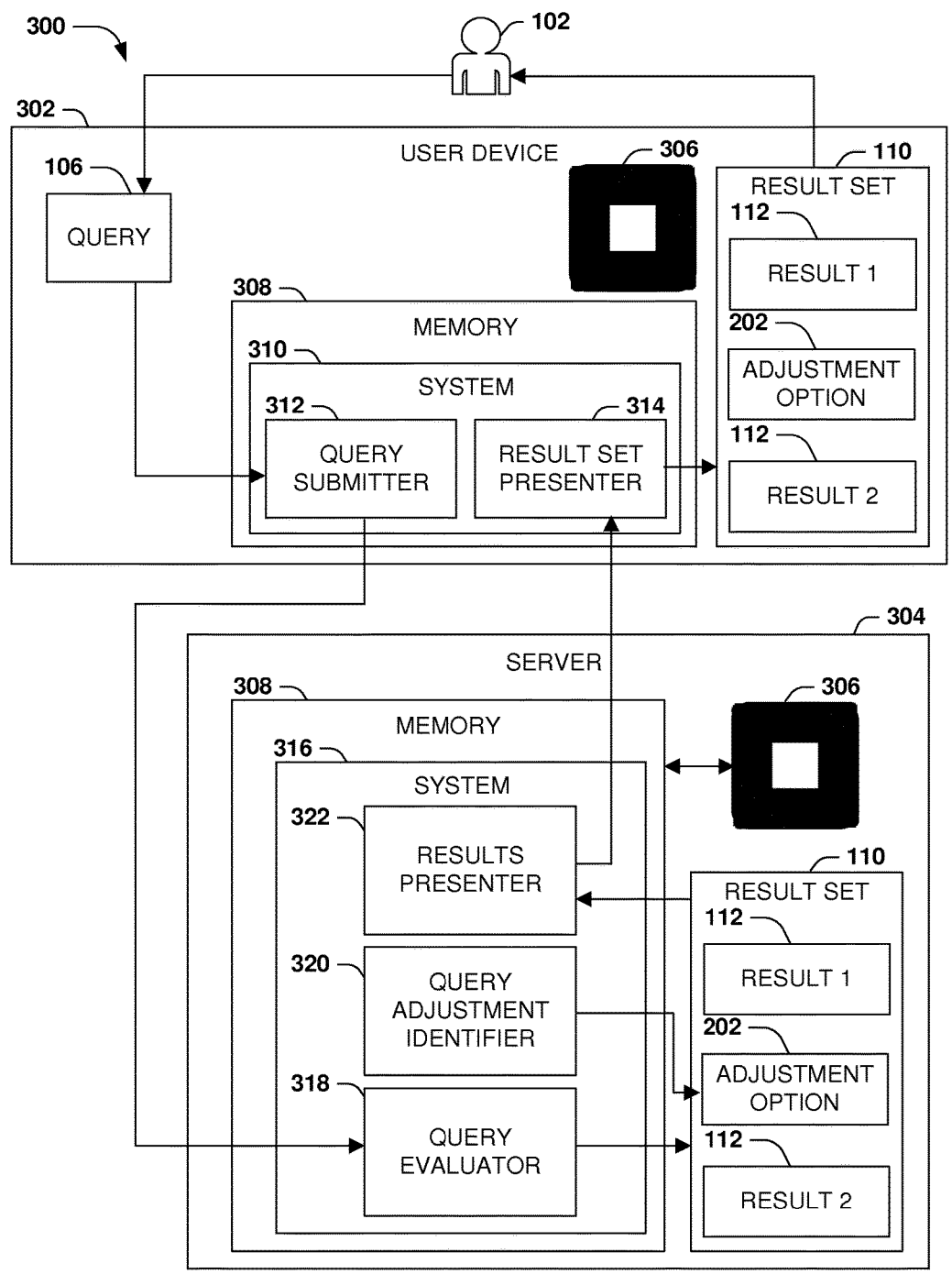
FIG. 3 is a component block diagram of example systems that enable a server and/or a user device to fulfill a literal query of a user through a presentation of a result set, accordance with the techniques presented herein.

FIG. 3 presents a first example embodiment of the techniques presented herein, illustrated as an example server 304 featuring an example system 316 that fulfills a literal query 106 expressing an intent of a user 102 of a user device 302. The example system 316 may be implemented, e.g., on a server 302 having a processor 306 and having access to a set of references, such as an index of web pages or documents, that may be selected and presented as results 122 for various literal queries 106. A portion of the server 302 may instead be on the user device 302, e.g., as a cache or sorter of the result set 110. Respective components of the example system 316 may be implemented, e.g., as a set of instructions stored in a memory 308 of the server 304 and executable on the processor 304 of the server 304 such that the interoperation of the components causes the server 304 to operate according to the techniques presented herein.

The example system 316 comprises a query evaluator 318, which identifies, for the literal query 106, at least two results 112 respectively having a result probability 114 of reflecting the intent of the user 102 in the submission of the literal query 106, and identifies a sort order according to the result probability 114 of the respective results 112. The example system 316 also comprises a query adjustment identifier 320, which determines, for the literal query 106, an adjusted query having an interpreted probability 204 of reflecting the intent of the user 102 in submitting the literal query 106, and identifies, within the sort order of the results 112, an adjustment position 206 that is between a first result 112 having a higher result probability 114 than the interpreted probability 204, and a second result 112 having a lower result probability 114 than the interpreted probability 204. The example system 316 also comprises a results presenter 322, which presents the result set 110 of the at least two results 112 to the user device 302 while inserting, at the adjustment position 206, an adjustment option 202 describing the adjusted query. The results presenter 322 also, responsive to a selection of the adjustment option 202, evaluates the adjusted query on behalf of the user 102 (e.g., by submitting the literal query 106 adjusted according to the adjustment option 202 in lieu of the original literal query 106, and replacing and/or updating the original result set 110 with results 112 for the adjusted query).

Alternatively or additionally, the user device 302 may also feature an example system 310 that interoperates with the server 304 to fulfill the literal query 106 of the user 102. The example system 310 of the user device 302 may comprise, e.g., a query submitter 312, which receives the literal query 106 form the user and transmits the literal query to the sever 304, and a result set presenter 314, which, upon receiving from the server 304 a result set 110 including an adjustment option 202 inserted at an adjustment position 206, presents the result set 110 to the user 102 (e.g., on a display of the user device 302). In this manner, the example server 304 and/or the example user device 302 may operate and/or interoperate to fulfill the literal query 106 of the user 102 in accordance with the techniques presented herein.

Figure 4:
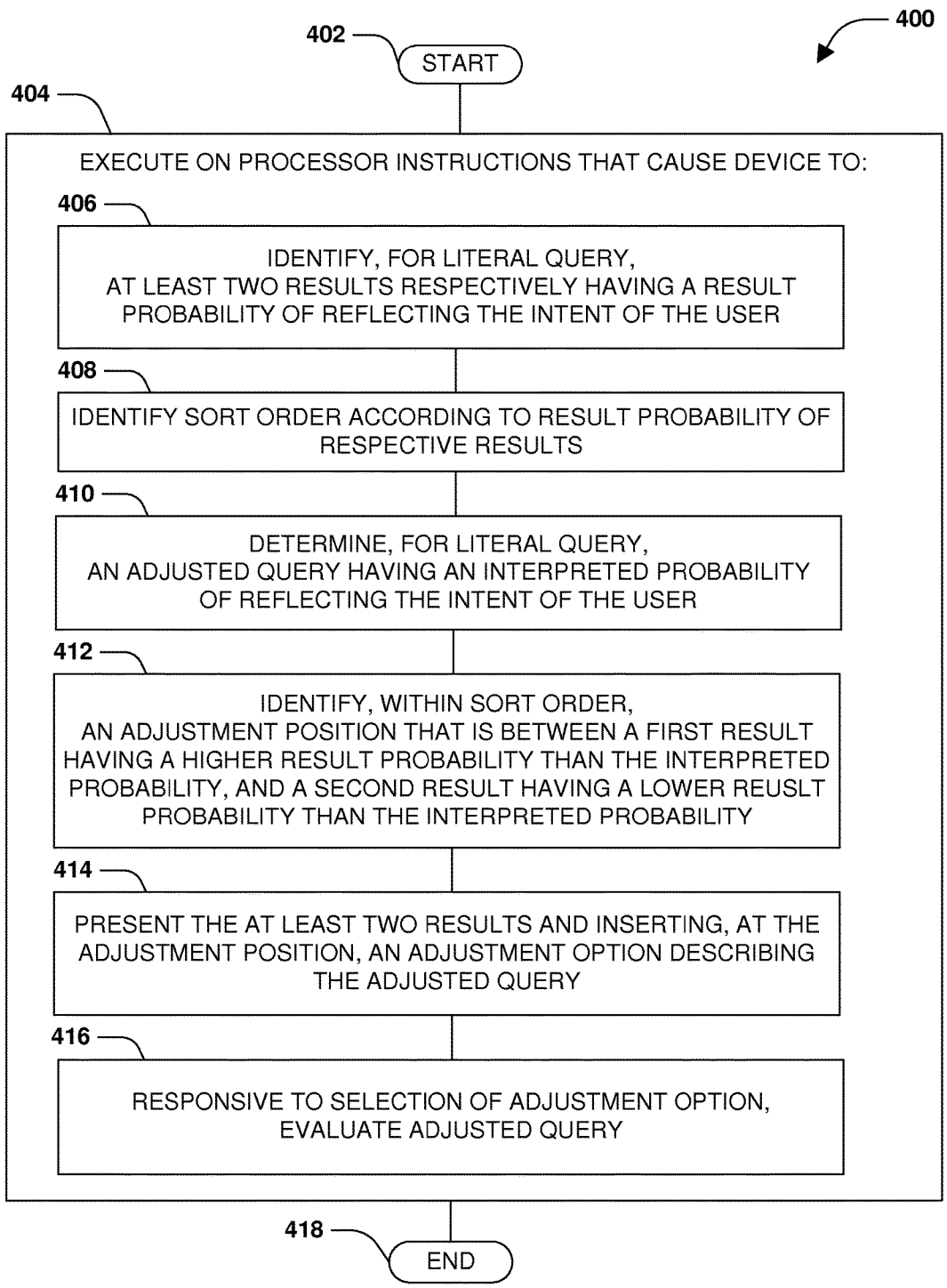
FIG. 4 is a flow diagram of an example method of fulfilling a literal query of a user through a presentation of a result set, in accordance with the techniques presented herein.

FIG. 4 presents a second example embodiment of the techniques presented herein, illustrated as an example method 400 of fulfilling a literal query expressing an intent of a user. The example method 400 may be implemented, e.g., as a set of instructions stored in a memory component of a device, such as a memory circuit, a platter of a hard disk drive, a solid-state storage device, or a magnetic or optical disc, and organized such that, when executed on a processor of the device, cause the device to operate according to the techniques presented herein.

The example method 400 begins at 402 and involves executing 404 the instructions on a processor of the device. Specifically, executing 404 the instructions on the processor causes the device to identify 406, for the literal query 106, at least two results 112 respectively having a result probability 114 of reflecting the intent of the user 102 in submitting the query 106. Executing 404 the instructions further causes the device to identify 408 a sort order according to the result probability 114 of the respective results 112. Executing 404 the instructions further causes the device to determine 410, for the literal query 106, an adjusted query having an interpreted probability 204 of reflecting the intent of the user 102. Executing 404 the instructions further causes the device to identify 412, within the sort order, an adjustment position 202 that is between a first result 112 having a higher result probability 114 than the interpreted probability 204, and a second result 112 having a lower result probability 114 than the interpreted probability 204. Executing 404 the instructions further causes the device to present 414 the at least two results 112, and inserting, at the adjustment position 206, an adjustment option 202 describing the adjusted query. Executing 404 the instructions further causes the device to, responsive to a selection of the adjustment option 202, evaluate 416 the adjusted query on behalf of the user 102. In this manner, the example method 400 achieves the fulfillment of the literal query 106 of the user 102 in accordance with the techniques presented herein, and so ends at 418.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 5:
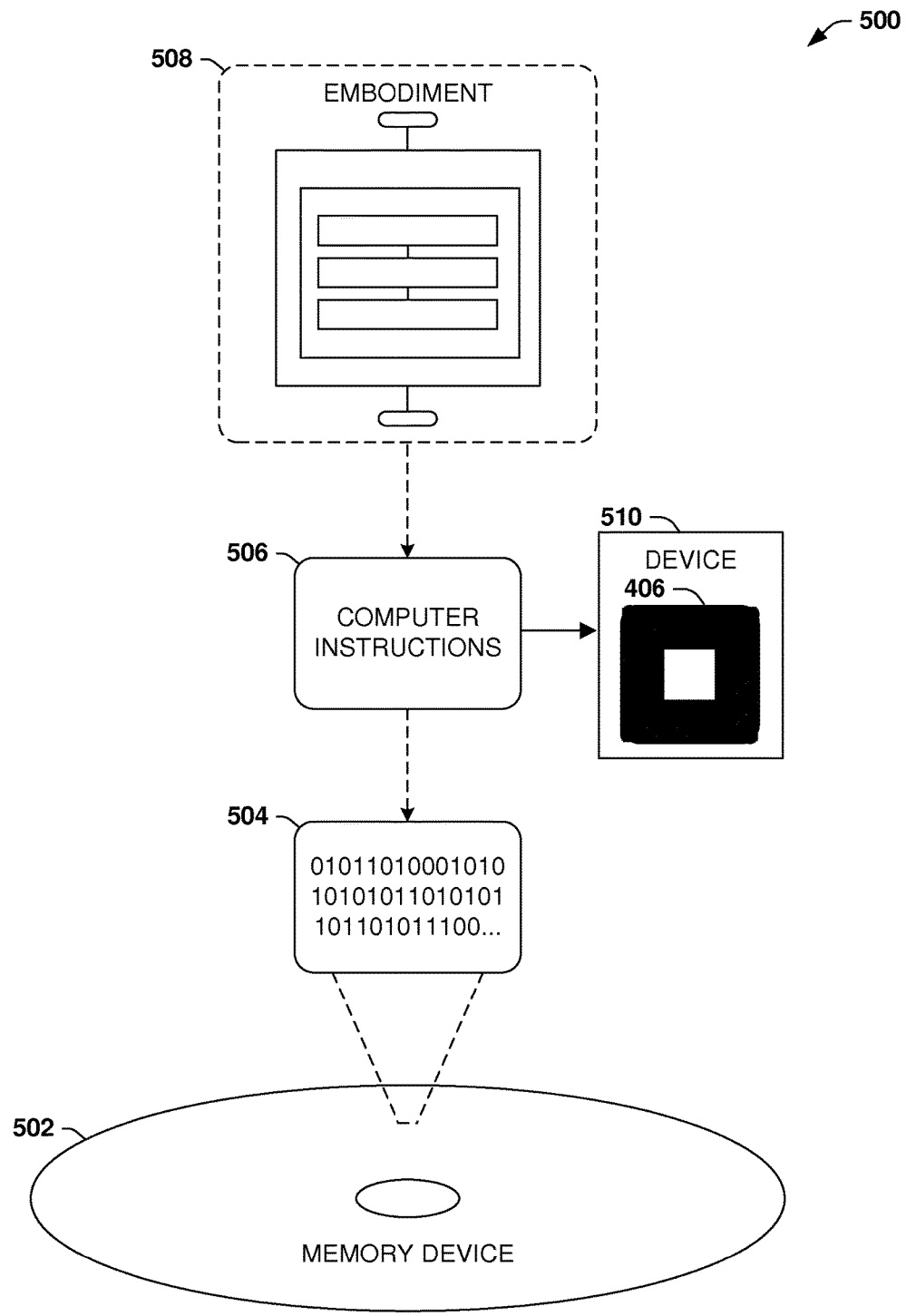
FIG. 5 is an illustration of an example computer-readable medium comprising processor-executable instructions configured to embody one or more of the provisions set forth herein.

An example computer-readable medium that may be devised in these ways is illustrated in FIG. 5, wherein the implementation 500 comprises a computer-readable memory device 502 (e.g., a CD-R, DVD-R, or a platter of a hard disk drive), on which is encoded computer-readable data 504. This computer-readable data 504 in turn comprises a set of computer instructions 506 that, when executed on a processor 406 of a device 510, cause the device 510 to operate according to the principles set forth herein. In a first such embodiment, the processor-executable instructions 506 may cause a user 302 and/or a server 304 to implement part or all of a system for fulfilling a literal query 106 of a user 102, such as the example systems 310, 316 presented in the example scenario 300 of FIG. 3. In a second such embodiment, the processor-executable instructions 506 may cause a device to fulfill a literal query 106 of a user 102, such as the example method 400 of FIG. 4. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example method 300 of FIG. 3; the example systems 410, 418 of FIG. 4; and the example memory device 502 of FIG. 5) to confer individual and/or synergistic advantages upon such embodiments.

E1. Scenarios

A first aspect that may vary among embodiments of these techniques relates to the scenarios wherein such techniques may be utilized.

As a first variation of this first aspect, many types of literal queries 106 may be received and fulfilled using the techniques presented herein. Such literal queries 106 may include, e.g., a text keyword query; a natural-language query; a spoken query; a gestural query, such as the user 102 manually pointing at a word or object of interest; and an inferred query based on an inference drawn from a narrative or conversation of the user 102.

As a second variation of this first aspect, the literal queries 106 may result in the submission of the literal query 106 to many types of query engines 108, and/or the presentation of result set 110 comprising many types of results 112. For example, the query engine 108 may comprise a web search engine that conduct a web search and presents web pages as results 112; a media search that searches a media library and presents media objects, such as audio recordings, images, and/or movies, as results 112; a file search that examines a file system and presents files as results 112; and a location search that provides a set of locations, optionally as a map, as results 112.

As a third variation of this first aspect, the literal query 106 may be received and fulfilled using many types of devices 104, such as a workstation or laptop; a mobile devices, such as a palmtop computer or mobile phone; a media device, such as a television or game console; a wearable device, such as an earpiece, eyewear, or watch; or a vehicle-embedded device, such as a vehicle navigation system provided in a dash or console of an automobile. Many such scenarios may be devised within which the techniques presented herein may be advantageously utilized.

E2. Identifying Query Adjustment and Interpreted Probability

A second aspect that may vary among embodiments of the techniques presented herein involves the manner of identifying a query adjustment of the literal query 106, and the interpreted probability 204 that the query adjustment reflects the intent of the user 102 in formulating the literal query 106.

Figure 6:
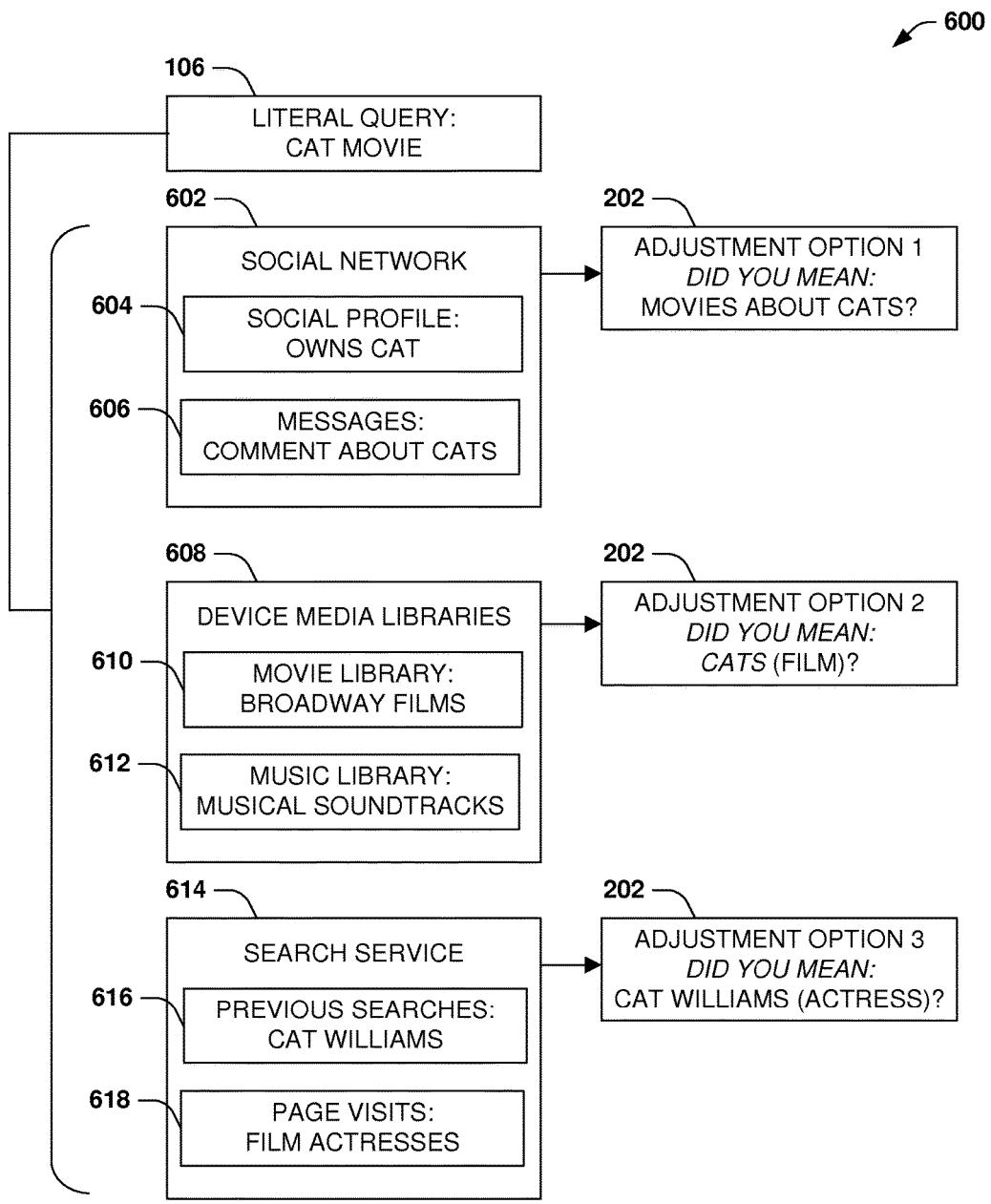
FIG. 6 is an illustration of an example scenario featuring a selection of adjustment options based on information retrieved from a variety of information sources in accordance with the techniques presented herein.

FIG. 6 presents an illustration of an example scenario 600 featuring a first variation of this second aspect, wherein the query adjustments 202 of the literal query 106 (such as the phrase "cat movie") submitted by a user 102 are identified based upon various sources of information about the user 102. As a first such example, a device may have access to a social network 602 that may contain sources of information about the user, such as a social profile 604 indicating that the user 102 owns a cat, and messages 606 exchanged between the user 102 and other individuals containing comments about cats. Accordingly, the device may determine that the user 102 has an interest in cats, which may promote the presentation of an adjustment option 202 involving movies about cats. As a second such example, a device may contain a set of media libraries 608, such as a movie library 610 containing film adaptations of Broadway plays, and a music library 610 containing soundtracks of musicals. Accordingly, the device may determine that the user 102 has an interest in film adaptations of musicals, which may promote the presentation of an adjustment option 202 involving the film Cats. As a third such example, a device may have access to a search service 614 that the user 102 utilizes, and may identify that the user 102 has previously submitted queries 616 involving a film actress named Cat Williams, and a record of page visits 618 including websites about film actresses. Accordingly, the device may determine that the user 102 has an interest in film actresses, which may promote the presentation of an adjustment option 202 for the film actress named Cat Williams. An embodiment of the techniques presented herein may utilize a variety of such information sources, and may utilize such information sources in combination and with relative significance (e.g., attributing more significance to more recent and/or more frequent searches, messages, and/or movies than to less recent and/or frequent information sources), in order to identify the adjustment options 202 for a literal query 106 to be presented to the user 102.

As a second variation of this second aspect, among various queries submitted by users 102, a selected query may be identified for which the results 112 respectively have a result probability that is below a result probability accuracy threshold (e.g., a query that users routinely submit, but that does not seem to have a satisfying set of results 112, based on poor user engagement with the results 112). Such selected queries may be selected for further evaluation to identify at least one adjusted query having an interpreted probability that is higher than the result probability accuracy threshold. For example, the selected query may comprise a routine misspelling of a name, such as "Gandi" or "Ghandi" submitted to reference the historical figure Mahatma Gandhi, and further evaluation of this query may enable an identification of the query adjustment "Gandhi" with a high interpreted probability 204 of reflecting the intent of the user 102.

As a third variation of this second aspect, an adjusted query may be identified for a literal query 106 by identifying at least two adjusted query results that respectively having an adjusted query result probability of reflecting the intent of the user 102, and identifying the interpreted probability 204 of the adjusted query according to the adjusted query result probabilities of the respective adjusted query results. For example, a first query adjustment and a second query adjustment may each appear to be a likely adjustment of a literal query 106, and selecting among these query adjustments may be achieved by evaluating the result probabilities 114 for the results 112 of each adjusted query.

A fourth set of variations of this second aspect involves inserting two or more adjustment options 202 into the result set 110, reflecting the same or different query adjustments of the literal query 106. For example, a device may determine, for a literal query 106, at least two adjusted queries respectively having an interpreted probability 204 of reflecting the intent of the user 102 in formulating the literal query 106, and may insert the respective adjustment options 202 for the respective adjusted queries at different adjustment positions 206 in the result set 110. As a first such example, the insertion of adjustment options 202 may be limited to an adjusted query count (e.g., presenting no more than five adjustment options 202 in the result set 110) and/or frequency (e.g., presenting no more than one adjustment option 202 per each set of ten results 112 of the literal query 106). As a second such example, responsive to presenting a first result set 110 to the user 102 for a first literal query 106, an embodiment may monitor an engagement of the user 102 with the query adjustment options 202, and may select an adjusted query count of the adjustment options 202 according to the engagement of the user 102 (e.g., upon detecting that the user 102 frequently chooses adjustment options 202, the device may insert more adjustment options 202 into the result sets 110 for future literal queries 106; and upon detecting that the user 102 rarely or never chooses adjustment options 202, the device may insert fewer or no adjustment options 202 into the result sets 110 for future literal queries 106). As a third such example, for a literal query 106, a device determine at least two adjusted queries that respectively describe a result category, and may insert adjustment options 202 for query adjustments where the result category that is different than the result category of the other query adjustments (e.g., presenting no more than one query adjustment referencing an individual; no more than one query adjustment referencing a movie; and no more than one query adjustment referencing a place).

As a fifth variation of this second aspect, after presenting a first result set that is responsive to the literal query 106, an embodiment may measure an engagement of the user 102 with the first result set 110 (e.g., determining whether the user 102 selects any of the results 112; whether the user revisits the result set 110 to select different results 112, indicating dissatisfaction with the earlier selected results 112; whether the user scrolls deep into the result set 110; and/or whether the user submits refinements of the literal query 106, and possibly a series of refinements of the literal query). If a second literal query 106 submitted by the user 102 results in a significantly higher engagement of the user 102 with the result set 110, the second literal query 106 may be identified as a query adjustment of the original literal query 106, and may be presented as an adjustment option 202 to other users 102 who subsequently submit the original literal query 106.

As a sixth variation of this second aspect, before receiving a literal query 106 of the user 102, an embodiment may generate a query adjustment set that identifies, for respective literal queries 106, at least one adjusted query having an interpreted probability 204 of reflecting the intent of the user 102 that is higher than the result probability 114 of at least one result 114 of the literal query 106. That is, an embodiment may pre-evaluate literal queries 106 that may be submitted by the user 102 (e.g., new terms that appear in documents or messages exchanged with the user 102, such as capitalized names that may represent individuals or places for which the user 102 may subsequently submit a literal query 106), and may pre-identify the adjustment options 202 and interpreted probabilities 204 to be presented in response to such literal queries 106. Subsequently, responsive to receiving the literal query 106 of the user 102, an embodiment may access the pre-identified query adjustment set to determine the adjusted query for the literal query 106. These and other techniques may be utilized to determine the adjusted queries, adjustment options 202, and/or interpreted probabilities 204 in accordance with the techniques presented herein.

E3. Selecting Adjustment Position

A third aspect that may vary among embodiments of the techniques presented herein involves the selection of an adjustment position 206 where an adjustment option 202 for an adjusted query is to be inserted into the result set 110 presented to the user 102. That is, identifying a location in the sort order between a higher-probability result 112 and a lower-probability result 112 (as compared with the interpreted probability 204) may be adjusted according to other considerations of the result set 110.

Figure 7:
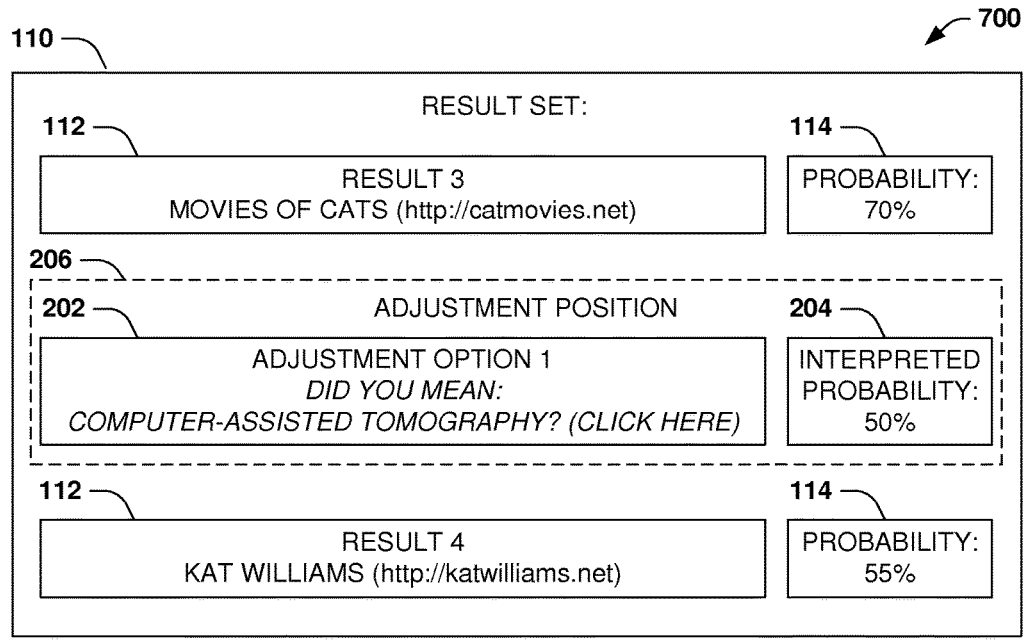
FIG. 7 is an illustration of an example scenario featuring a first technique for varying the insertion of an adjustment option in a result set in accordance with the techniques presented herein.

FIG. 7 presents an illustration of an example scenario 700 featuring a first variation of this third aspect, where an adjustment position 206 is identified within the sort order as a probability difference between the result probability 114 of the first result 112 and the result probability 114 of the second result 112, where the probability difference is higher than a probability difference threshold. For example, where the results 112 exhibit a comparatively small range of result probabilities 114, the adjustment option 202 may be withheld from insertion; and a location where the results 112 exhibit a large change in result probability 114 (e.g., a first result 112 having an 80% result probability 114 and a second successive result 112 having only a 45% result probability 114) may be interested as a transition between an exhausted group of likely results and an arbitrary selection of unlikely results 114, and an adjustment position 206 may be inserted between such results 112, even if the interpreted probability 204 is not within the identified range.

Figure 8:
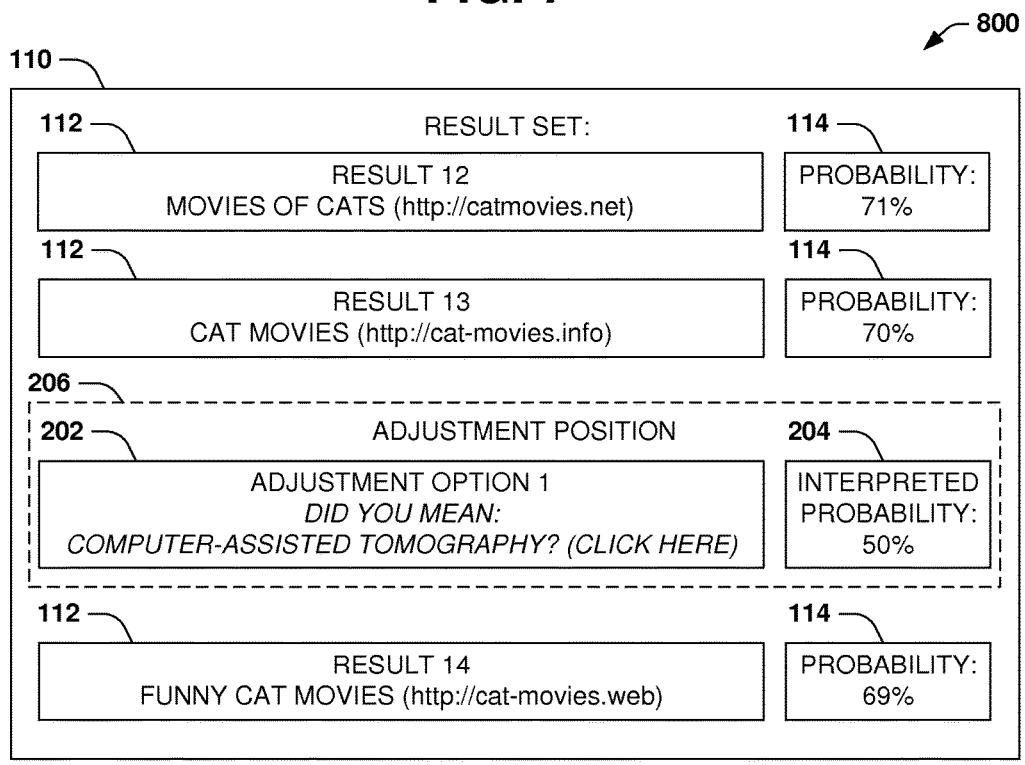
FIG. 8 is an illustration of an example scenario featuring a second technique for varying the insertion of an adjustment option in a result set in accordance with the techniques presented herein.

FIG. 8 presents an illustration of an example scenario 800 featuring a second variation of this third aspect, wherein the adjustment position 206 is identified within the sort order as a group of results 112 having result probabilities that are within a result probability range limit. For example, a set of successive results 112 may be identified that pertain to the same topic, but the topic to which the results 112 relate may not reflect the intent of the user 102 in submitting the literal query 106, and the user 102 may become frustrated by the length of the group of similar and undesired results 112. Accordingly, it may be desirable to insert an adjustment option 206 within such results 112, e.g., to provide an alternative to the group of results 112 involving the same topic.

As a third variation of this third aspect, identifying the adjustment position 206 of an adjustment option 220 may involve weighting the selection of the adjustment position 206 proportionally with a result count of results 112 presented in response to the literal query 106. For example, it may be desirable to insert an adjustment option 202 approximately once every twelve results 112. The adjustment positions 206 may therefore be adjusted to provide adjustment options 202 at consistent intervals of results 112 within the results set 110.

As a fourth variation of this third aspect, after presenting results 112 to the user 102, an embodiment may monitor an engagement of the user 102 with the results 112, and may alter the adjustment position 206 of the adjustment option 202 within the sort order according to the engagement of the user 102 with the results 112. For example, a user 102 who is carefully reviewing and considering search results 112 in series may be identified as likely satisfied with the result set 110, and an adjustment option 202 may be reduced to a lower adjustment position 206 in the sort order (e.g., hiding the adjustment option 202 or presenting such adjustment options 202 at less frequent intervals within the result set 110). Conversely, a user 102 who is rapidly browsing the result set 110, e.g., scrolling through the results 112 and skipping over a majority of the results 112, may be identified as likely dissatisfied with the result set 110, and adjustment options 220 may be raised to a higher adjustment position 206 in the sort order (e.g., moving adjustment options 202 up and into the attention of the user 102, and/or presenting such adjustment options 202 earlier and/or with greater frequency).

As a fifth variation of this third aspect, after presenting results 112 to the user 102 and responsive to receiving a request to adjust the literal query 106, an embodiment may present a second result set 110 to the user 102 that is responsive to the request. However, because such a request may indicate dissatisfaction of the user 102 with the result 102 and/or difficulty identifying a literal query 106 that reflects the intent of the user 102, a device may also raise the adjustment position 206 of the adjustment options 202 in the sort order of the second result set 110, e.g., more assertively suggesting helpful options to the user 102. Many such techniques may be utilized to select the adjustment positions 206 of the adjustment options 202 in accordance with the techniques presented herein.

E4. Presenting Adjustment Options

A fourth aspect that may vary among embodiments of the techniques presented herein involves the manner of presenting the adjustment options 202 within the result set 110.

As a first variation of this fourth aspect, responsive to receiving from the user 102 a selection of an adjusted query count of the adjusted queries inserted into the result set 110, an embodiment may adjust the adjusted query count according to the selection (e.g., the user 102 may explicitly indicate the number of adjustment options 202 to include in the result set 110, such as selecting a percentage between 0% and 100%, or specifying a minimum and/or maximum number of adjustment options 202 to be included).

As a second variation of this fourth aspect, the results 112 of the result set 110 may be presented in a first presentation style (e.g., a first font, font style, size, color, or button type), and the adjustment option inserted between such results 112 may be presented with a second presentation style that is different from the first presentation style (e.g., a different font different or font style that visually distinguishes the adjustment options 202 from the results 112).

As a third variation of this fourth aspect, after presenting the results 112 to the user 102, a device may monitor an engagement of the user 102 with the results 112 and the adjustment option 202, and may adjust the result probabilities 114 of the results 112 and/or the interpreted probability 204 of the adjusted query according to the engagement of the user 102 therewith. For example, if the user 102 hovers over, selects, shares, and/or bookmarks a particular result 112 or adjustment option 202, the probability of the selected item may be increased for the query 106; and if the user 102 skips over a result 112 or adjustment option 202, the probability of the selected item may be reduced.

Figure 9:
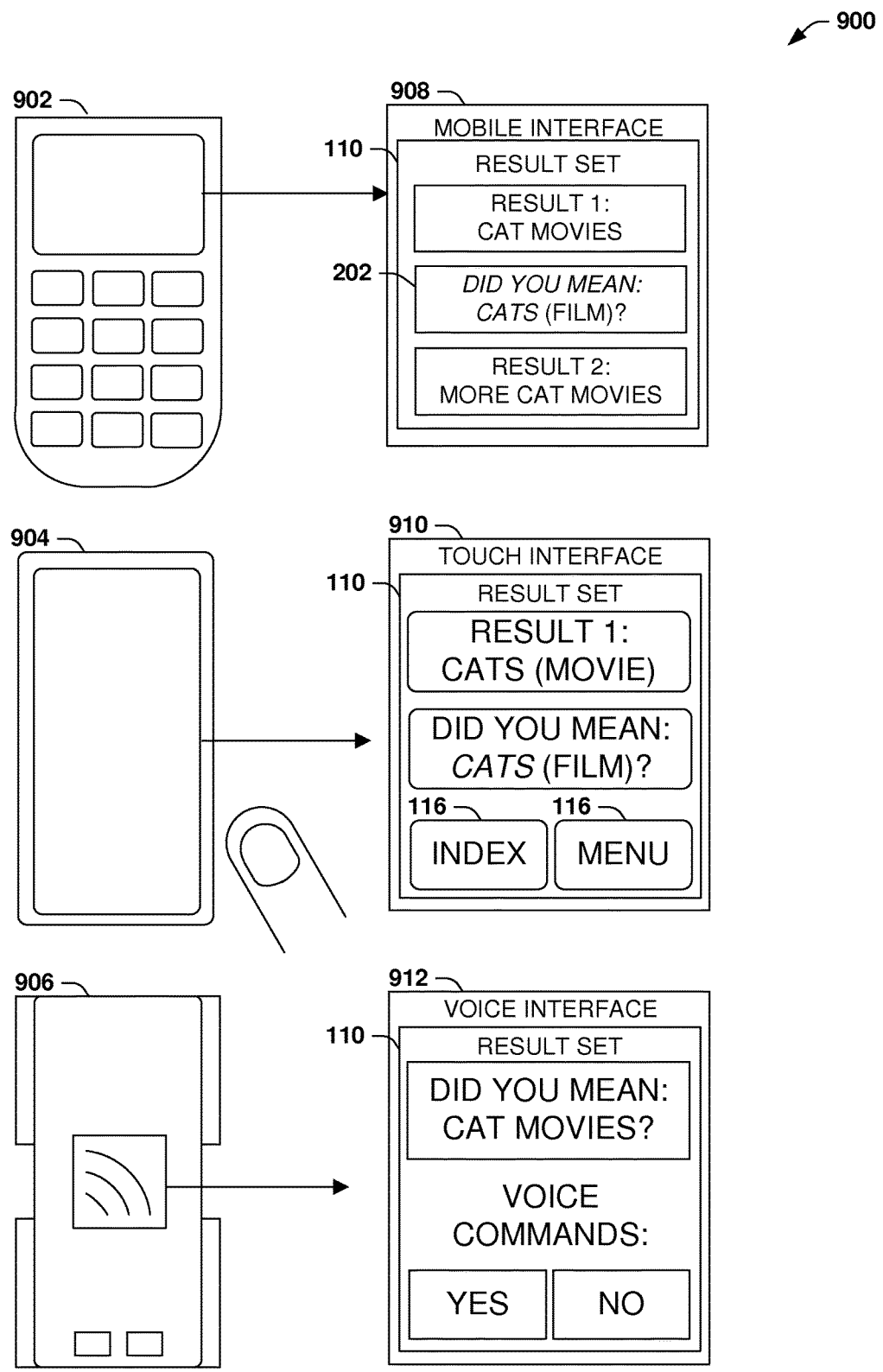
FIG. 9 is an illustration of an example scenario featuring an adaptation of the user interface based upon characteristics of the device in accordance with the techniques presented herein.

FIG. 9 presents an illustration of scenarios 900 featuring a fourth set of variations of this fourth aspect, wherein the presentation of result sets 110 may be adapted to the characteristics of the user interface of the device on which such result sets 110 are presented. As a first such example, a first device 902 may feature a comparatively small display, such as a miniature mobile phone or a wearable device such as a watch. Accordingly, the result set 110 may be paginated over many pages for presentation in a mobile interface 908, and may present three options per page with the adjustment option 202 presented between the first query result and the second query result. As a second such example, the device may comprise a touch-oriented device 904 with a touch interface 910 that is intended to be operated with a fingertip, such as a tablet or buttonless mobile phone. Accordingly, the result set 110 may be adapted for the lower precision of touch interfaces 910, e.g., by adapting the result set 110 to display the query results and the adjustment option 202 with large, touch-accessible buttons, and with a reduced number of options per page in order to provide space for larger buttons. As a third such example, the device may comprise a vehicle 906 that communicates with the user 102 via a voice interface 912. Accordingly, the result set 110 may be adapted for voice interaction, such as a voice prompt indicating the adjustment option 202 as the third option in an audio stream of voice-rendered result set 110, and with specific voice prompts, such as a first voice prompt to accept the adjustment option 202, and a second voice prompt to decline the adjustment option 202 and to present further query results. In this manner, a device that presents the result set 110 to the user 102 including the adjustment option 202 may provide many types of adjustments of the user interface in view of the characteristics of the device, the type of user interface, and/or and the circumstances under which the result set 110 is presented to the user 102. Many such variations involving the interaction of the user 102 with the result set 110 may be included in variations of the techniques presented herein.

F. Computing Environment

Figure 10:
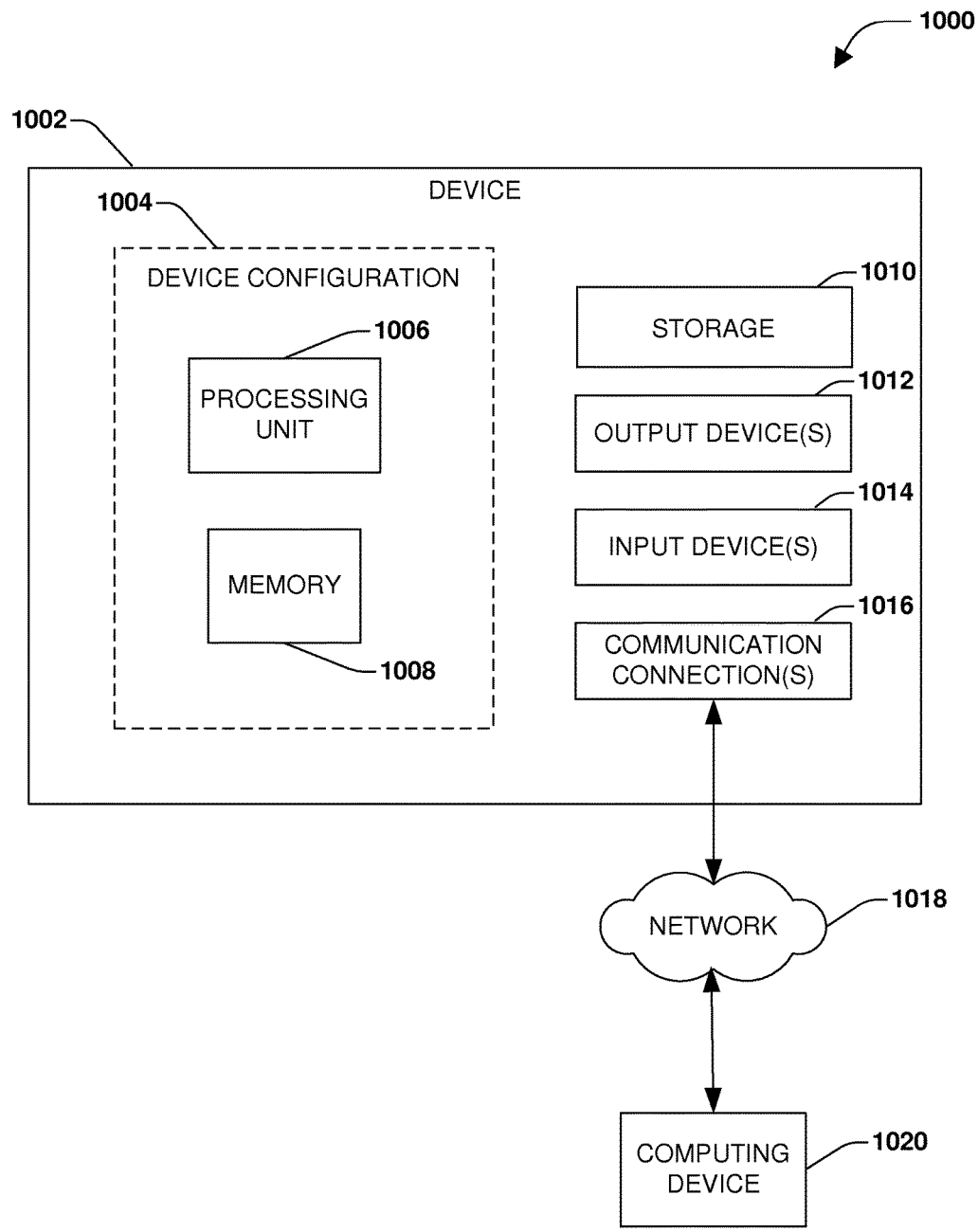
FIG. 10 is an illustration of an example computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer-readable memory devices that exclude other forms of computer-readable media comprising communications media, such as signals. Such computer-readable memory devices may be volatile and/or nonvolatile, removable and/or non-removable, and may involve various types of physical devices storing computer readable instructions or other data. Memory 1008 and storage 1010 are examples of computer storage media. Computer-storage storage devices include, but are not limited to, RAM, ROM, EEPROM, flash memory or other memory technology, CD-ROM, Digital Versatile Disks (DVDs) or other optical storage, magnetic cassettes, magnetic tape, and magnetic disk storage or other magnetic storage devices.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices. Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network. For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A server that fulfills a literal query of a user, the server comprising:
   a processor; and
   a memory storing instructions that, when executed by the processor, cause the server to:
   identify, for the literal query, at least two literal query results;
   generate result probabilities for the at least two literal query results based on results that were previously selected by other users who previously submitted the literal query, the result probabilities reflecting a probability that a corresponding literal query result matches an intent of the user in submitting the literal query;
   identify a sort order according to the result probabilities of the at least two literal query results;
   determines, for the literal query, an adjusted query;
   evaluate the adjusted query in order to identify, for the adjusted query, one or more adjusted query results;
   generate an interpreted probability for the adjusted query based on result probabilities of at least some of the adjusted query results, the interpreted probability reflecting a probability that the user intended the adjusted query;
   identify, within the sort order, an adjustment position that is between a first literal query result having a higher result probability than the interpreted probability, and a second literal query result having a lower result probability than the interpreted probability; and
   present the at least two literal query results and insert, at the adjustment position, an adjustment option describing the adjusted query.

2. The server of claim 1, wherein the determining the adjusted query is only performed if
   the at least two literal query results have corresponding result probabilities below a result probability accuracy threshold.

3. The server of claim 1, wherein determining the adjusted query further comprises, after presenting a first result set that is responsive to the literal query:
   measuring an engagement of the user with the first result set;
   receiving a second query that is responsive to the at least two literal query results; and
   after presenting a second result set that is responsive to the second query, responsive to measuring an engagement of the user with the second result set that is higher than the first engagement of the user with the first result set, identify the second query as an adjusted query of the literal query.

4. The server of claim 1, wherein the memory stores further instructions that, when executed by the processor, cause the server to further:
   generate a query adjustment set that correlates literal queries and corresponding adjusted queries, each adjusted query having an interpreted probability higher than a result probability of at least one result of a corresponding literal query; and
   determining the adjusted query by reference to a previously generated query adjustment set.

5. The server of claim 1, wherein the memory stores further instructions that, when executed by the processor, cause the server to further:
   evaluate the adjusted query, responsive to a selection of the adjustment option, in order to identify multiple adjusted query results comprising the one or more adjusted query results identified by a prior evaluation of the adjusted query; and
   present the identified multiple adjusted query results.

6. A method of fulfilling a literal query, the method comprising:
   executing, by one or more processors of one or more servers, instructions that cause at least some of the one or more servers to:
   identify, for the literal query, at least two literal query results;
   generate result probabilities for the at least two literal query results based on results that were previously selected by other users who previously submitted the literal query, the result probabilities reflecting a probability that a corresponding literal query result matches an intent of the user in submitting the literal query;
   identify a sort order according to the result probabilities of the at least two literal query results;
   determine, for the literal query, an adjusted query;

evaluate the adjusted query in order to identify, for the adjusted query, one or more adjusted query results;

generate an interpreted probability for the adjusted query based on result probabilities of at least some of the adjusted query results, the interpreted probability reflecting a probability that the user intended the adjusted query;

identify, within the sort order, an adjustment position that is between a first literal query result having a higher result probability than the interpreted probability, and a second literal query result having a lower result probability than the interpreted probability; and present the at least two literal query results and insert, at the adjustment position, an adjustment option describing the adjusted query.

7. The method of claim 6, wherein identifying the adjustment position further comprises: identifying, within the sort order, a probability difference between a result probability of the first literal query result and a result probability of the second literal query result, where the probability difference is larger than a probability difference threshold.

8. The method of claim 6, wherein identifying the adjustment position further comprises: identifying, within the sort order, a group of literal query results having corresponding result probabilities that are all within a result probability range limit.

9. The method of claim 6, wherein identifying the adjustment position further comprises: weighting selection of the adjustment position proportionally with a result count of the at least two literal query results that were presented in response to the literal query.

10. The method of claim 6, wherein the instructions further cause the one or more processors of the at least some of the one or more servers to, after presenting the at least two literal query results to the user:

monitor an engagement of the user with the at least two literal query results; and alter the adjustment position of the adjustment option within the sort order according to the monitored engagement of the user with the at least two literal query results.

11. The method of claim 10, wherein monitoring the engagement of the user with the at least two literal query results further comprises detecting at least one of:
a consideration of a selected literal query result by the user, and
a skipping of at least some of the at least two literal query results by the user; and wherein further the altering the adjustment position of the adjustment option further comprises:
responsive to the detecting the consideration of the selected literal query result by the user, reducing the adjustment position of the adjustment option in the sort order; and
responsive to the detecting the skipping of the at least some of the at least two results by the user, raising the adjustment position of the adjustment option in the sort order.

12. The method of claim 6, wherein the instructions further cause the one or more processors of the at least some of the one or more servers to, after presenting the at least two literal query results from the user and responsive to receiving a request to adjust the literal query:

present a second result set to the user responsive to the request, and raise the adjustment position of the adjustment option in the sort order of the second result set.

13. The method of claim 6, wherein the instructions further cause the one or more processors of the at least some of the one or more servers to:

evaluate the adjusted query, responsive to a selection of the adjustment option, in order to identify multiple adjusted query results comprising the one or more adjusted query results identified by a prior evaluation of the adjusted query; and present the identified multiple adjusted query results.

14. A memory device storing instructions that, when executed by a processor of a computer, cause the computer to fulfill a literal query by:

identifying, for the literal query, at least two literal query results;

generate result probabilities for the at least two literal query results based on results that were previously selected by other users who previously submitted the literal query, the result probabilities reflecting a probability that a corresponding literal query result matches an intent of the user in submitting the literal query;

identifying a sort order according to the result probabilities of the at least two literal query results;

determining, for the literal query, an adjusted query;

evaluate the adjusted query in order to identify, for the adjusted query, one or more adjusted query results;

generate an interpreted probability for the adjusted query based on result probabilities of at least some of the adjusted query results, the interpreted probability reflecting a probability that the user intended the adjusted query;

identifying, within the sort order, an adjustment position that is between a first literal query result having a higher result probability than the interpreted probability, and a second literal query result having a lower result probability than the interpreted probability;

presenting the at least two literal query results and inserting, at the adjustment position, an adjustment option describing the adjusted query.

15. The memory device of claim 14, wherein determining the adjusted query further comprises: determining multiple adjusted queries, each having corresponding interpreted probabilities; and wherein further the inserting the adjustment option comprises inserting multiple adjustment options, each describing one or more of the multiple adjusted queries, at multiple adjustment positions based on the corresponding interpreted probabilities of the one or more adjusted queries described by the multiple adjustment options.

16. The memory device of claim 15, wherein a quantity of the multiple adjusted queries described by the inserted multiple adjustment options is limited based on the corresponding interpreted probability of respective ones of the multiple adjusted queries.

17. The memory device of claim 15, wherein a quantity of the multiple adjusted queries described by the inserted multiple adjustment options is limited based on a detected engagement of the user with the at multiple adjusted queries described by the multiple adjustment options inserted into the first result set.

18. The memory device of claim 14, wherein the determining the adjusted query further comprises: determining, for the literal query, at least two adjusted queries that respectively each describe result categories that differ from result categories of others of the at least two adjusted queries.

19. The memory device of claim 14, wherein the presenting the at least two literal query results further comprises:
   presenting the at least two literal query results in a first presentation style; and
   inserting, into the at least two literal query results, the adjustment option with a second presentation style that is different from the first presentation style of the at least two literal query results.

20. The memory device of claim 14, wherein
   the result probabilities of the literal query results and the interpreted probability of the adjusted query are adjusted according to engagement of the user with the least two literal query results and the adjustment option.

* * * * *